US012701402B2

(12) United States Patent
Wang et al.

(10) Patent No.: US 12,701,402 B2
(45) Date of Patent: Aug. 4, 2026

(54) eSIM DEVICE CONFIGURATION SYSTEM, METHOD AND APPARATUS, AND STORAGE MEDIUM

(71) Applicant: E SURFING IOT CO., LTD., Guangzhou (CN)

(72) Inventors: Chengzhi Wang, Guangzhou (CN); Min Wei, Guangzhou (CN); Mingyao Yu, Guangzhou (CN)

(73) Assignee: E SURFING IOT CO., LTD., Guangzhou (CN)

( * ) Notice: Subject to any disclaimer, the term of this patent is extended or adjusted under 35 U.S.C. 154(b) by 389 days.

(21) Appl. No.: 18/682,567

(22) PCT Filed: Dec. 22, 2021

(86) PCT No.: PCT/CN2021/140445
§ 371 (c)(1),
(2) Date: Apr. 1, 2024

(87) PCT Pub. No.: WO2023/015816
PCT Pub. Date: Feb. 16, 2023

(65) Prior Publication Data
US 2024/0365107 A1 Oct. 31, 2024

(30) Foreign Application Priority Data

Aug. 11, 2021 (CN) .......................... 202110920956.3

(51) Int. Cl.
*H04W 8/18* (2009.01)
*H04W 8/20* (2009.01)
*H04W 8/26* (2009.01)
(52) U.S. Cl.
CPC ........... *H04W 8/205* (2013.01); *H04W 8/265* (2013.01)

(58) Field of Classification Search
None
See application file for complete search history.

(56) References Cited

U.S. PATENT DOCUMENTS 11,057,827 B1* 7/2021 Dreiling ................ H04W 12/40
2018/0060199 A1* 3/2018 Li ........................ G06F 11/2094
(Continued)

FOREIGN PATENT DOCUMENTS

CN 108848453 A 11/2018
CN 110366163 A 10/2019
(Continued)

OTHER PUBLICATIONS

First Search report for Chinese family patent No. 202110920956.3, issued on Sep. 15, 2023 and English translation.
(Continued)

*Primary Examiner* — Anthony S Addy
*Assistant Examiner* — Andres Rafael Sanchez
(74) *Attorney, Agent, or Firm* — Quarles & Brady LLP

(57) ABSTRACT

An eSIM device configuration system, method and apparatus and a storage medium are disclosed, which relate to the technical field of communication. The eSIM device configuration system includes an eSIM device, an eSIM operation terminal and an eSIM management terminal. The eSIM device detects a wireless environment to obtain wireless information and reports the wireless information to the eSIM operation terminal. The eSIM operation terminal selects a proper integrate circuit card identity according to the wireless information. The eSIM management terminal generates a Profile according to the integrate circuit card identity and sends the Profile to the eSIM device for activation, and selects a proper Profile by selecting a proper integrate circuit card identity to be written into the eSIM device, thus optimizing a communication network of the eSIM device.

11 Claims, 3 Drawing Sheets

(56)                    References Cited

U.S. PATENT DOCUMENTS

2019/0069122 A1      2/2019  Karimli et al.
2020/0186992 A1*     6/2020  Bas Sanchez ......... H04W 8/20

FOREIGN PATENT DOCUMENTS

CN          110536284  A     12/2019
CN          112153627  A     12/2019
CN          112437429  A      3/2021
CN          113810899  A     12/2021

OTHER PUBLICATIONS

First Office action for Chinese family patent No. 202110920956.3, issued on Sep. 15, 2023 and English translation.
Second Office action for Chinese family patent No. 202110920956.3, issued on Apr. 1, 2024 and English translation.
Decision of Rejection for Chinese family patent No. 202110920956.3, issued on Jul. 25, 2024 and English translation.
International Search Report and Written Opinion for PCT Application No. PCT/CN2021/140445 and English translation, mailed Apr. 26, 2022. pp. 1-11.
"Design and implementation of the information filtering System based on rule-matching algorithms", published on Journal of Shaanxi University of Science & Technology, by Zhao Jijun, Hu Qixiu, Feng Qian, Li Lu, Xiang Lankang, Feb. 25, 2010.

* cited by examiner

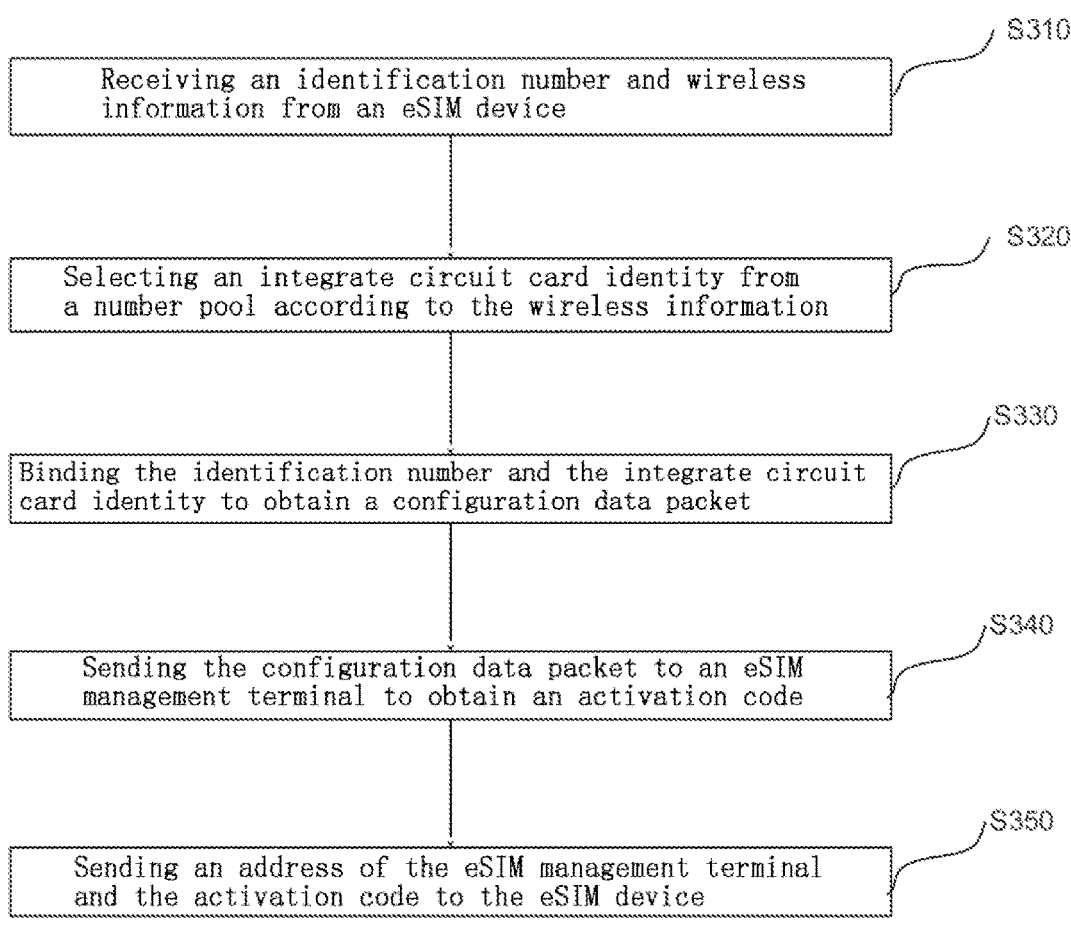

S310

Receiving an identification number and wireless information from an eSIM device

S320

Selecting an integrate circuit card identity from a number pool according to the wireless information

S330

Binding the identification number and the integrate circuit card identity to obtain a configuration data packet

S340

Sending the configuration data packet to an eSIM management terminal to obtain an activation code

S350

Sending an address of the eSIM management terminal and the activation code to the eSIM device

FIG. 3

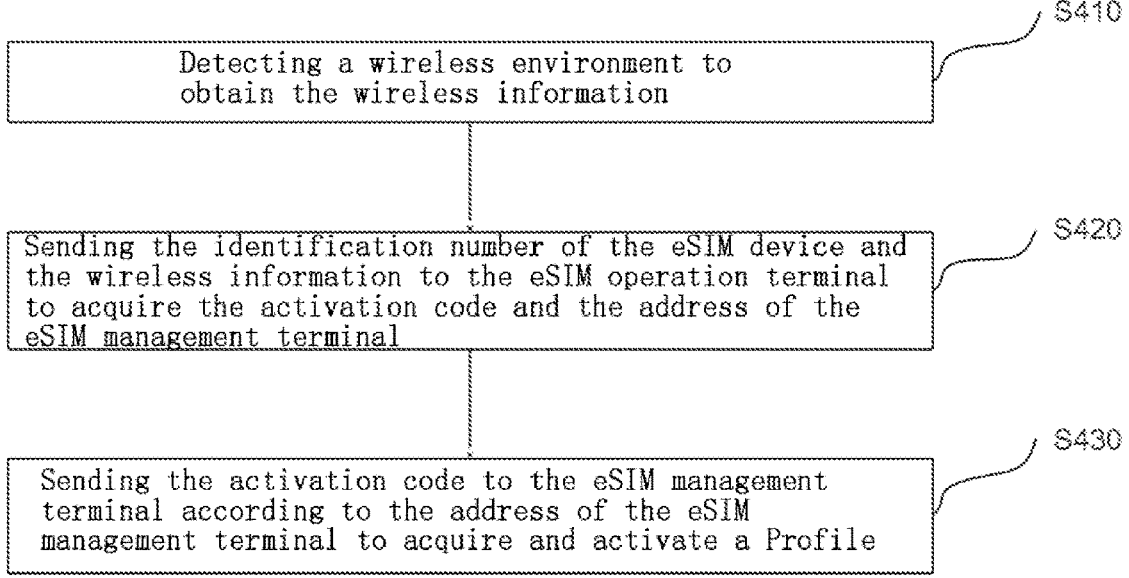

S410

Detecting a wireless environment to obtain the wireless information

S420

Sending the identification number of the eSIM device and the wireless information to the eSIM operation terminal to acquire the activation code and the address of the eSIM management terminal

S430

Sending the activation code to the eSIM management terminal according to the address of the eSIM management terminal to acquire and activate a Profile

FIG. 4

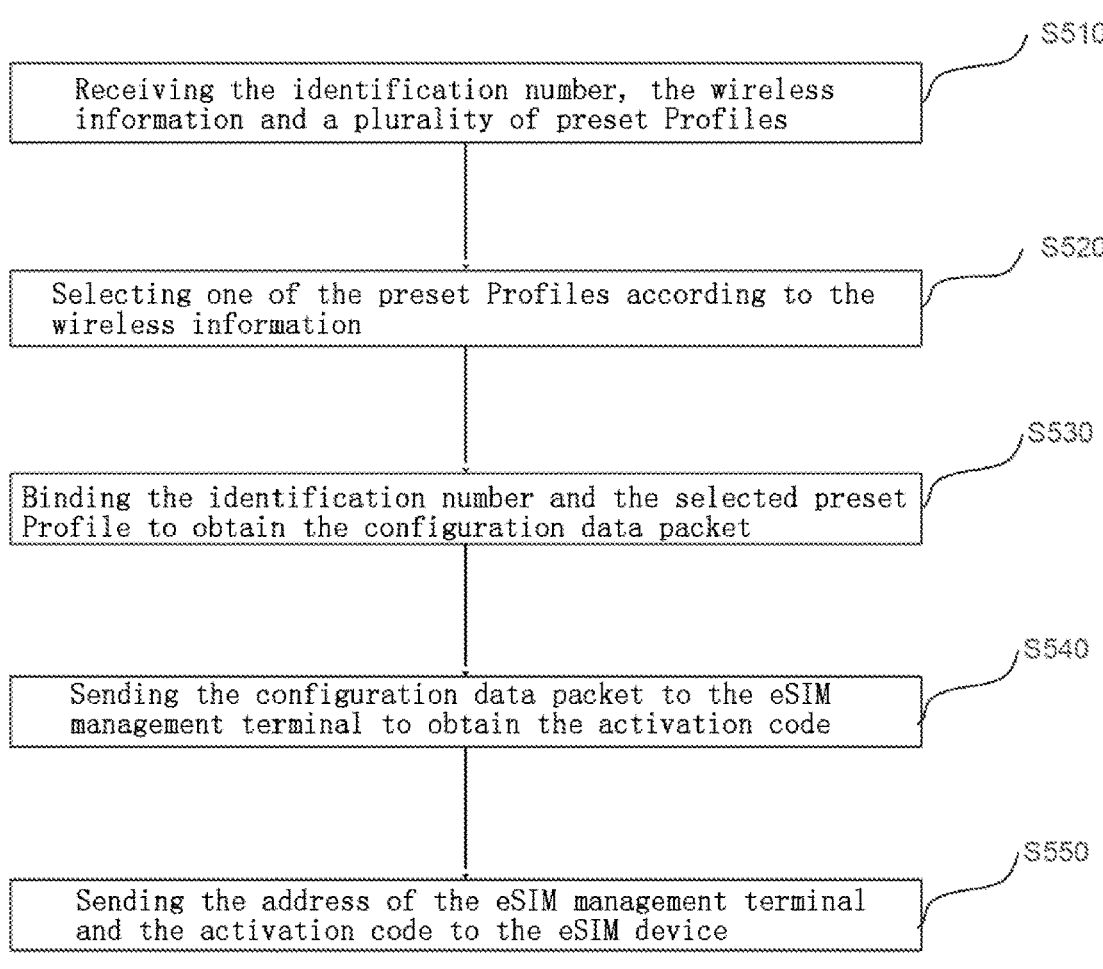

S510

Receiving the identification number, the wireless information and a plurality of preset Profiles

S520

Selecting one of the preset Profiles according to the wireless information

S530

Binding the identification number and the selected preset Profile to obtain the configuration data packet

S540

Sending the configuration data packet to the eSIM management terminal to obtain the activation code

S550

Sending the address of the eSIM management terminal and the activation code to the eSIM device

FIG. 5

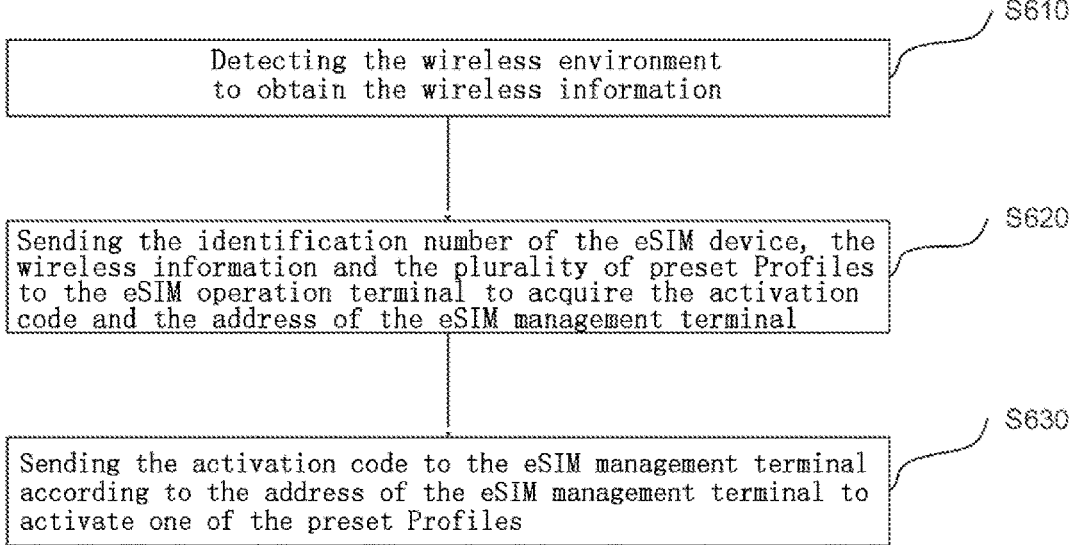

S610

Detecting the wireless environment to obtain the wireless information

S620

Sending the identification number of the eSIM device, the wireless information and the plurality of preset Profiles to the eSIM operation terminal to acquire the activation code and the address of the eSIM management terminal

S630

Sending the activation code to the eSIM management terminal according to the address of the eSIM management terminal to activate one of the preset Profiles

FIG. 6 eSIM DEVICE CONFIGURATION SYSTEM, METHOD AND APPARATUS, AND STORAGE MEDIUM

CROSS-REFERENCE TO RELATED APPLICATIONS

This application is a national stage filing under 35 U.S.C. § 371 of international application number PCT/CN2021/140445, filed Dec. 22, 2021, which claims priority to Chinese patent application No. 202110920956.3 filed Aug. 11, 2021. The contents of these applications are incorporated herein by reference in their entirety.

TECHNICAL FIELD

The present disclosure relates to the technical filed of communication, and particularly to an eSIM device configuration system, method and apparatus, and a storage medium.

BACKGROUND

At present, mainstream SIM cards comprise traditional inserting cards and eSIM cards. The eSIM cards are characterized in that they can be integrated before being written with a number, which brings advantages and convenience to the large-scale production of Internet of Things device. They are more suitable for applications with high volume requirements and complex conditions such as humidity, high temperature, corrosion, and vibration, leading to rapid development in the Internet of Things industry. In the related art, the process for remotely configuring services for an eSIM is as follows. An eSIM device interacts with a mobile phone or a computer by using Bluetooth, WiFi and other near-area networks, and a user logs in to an eSIM management platform through a mobile phone or a production line computer as a main device to complete a number writing operation.

However, the Internet of Things terminal operates in an complex environment characterized by wide area, no people and autonomy. The method of using mobile phones or computers to participate in the number writing process is not suitable for such complex environments. Therefore, the eSIM device needs to use a wide area network to autonomously trigger the number writing operation in a number writing platform on demand. In the related art, an operator Profile (user subscription parameter set) is preset in the eSIM to access an operator network. Through interaction with the eSIM management platform via the operator wireless network, the Profile can be downloaded and activated to complete the number writing operation.

However, the Profile written into the eSIM device may not meet the network requirement of the Internet of Things terminal, which leads to the decline of the communication performance of the eSIM device.

SUMMARY

In order to solve at least one of the above technical problems, the present disclosure provides an eSIM device configuration system, method and apparatus and a storage medium, so that a proper Profile can be selected to be written into the eSIM device, thus optimizing a communication network of the eSIM device.

In a first aspect, an embodiment of the present disclosure provides an eSIM device configuration system, which comprises an eSIM device, an eSIM operation terminal and an eSIM management terminal, wherein a preset Profile is written into the eSIM device, and the eSIM device is configured to access the eSIM operation terminal through the preset Profile:

the eSIM device comprises a request module configured for detecting a wireless environment to obtain wireless information, and sending an identification number of the eSIM device and the wireless information to the eSIM operation terminal;

the eSIM operation terminal comprises a number selection module configured for receiving the identification number and the wireless information, selecting an integrate circuit card identity from a number pool according to the wireless information, binding the identification number and the integrate circuit card identity to obtain a configuration data packet, sending the configuration data packet to the eSIM management terminal to obtain an activation code, and sending an address of the eSIM management terminal and the activation code to the eSIM device;

the eSIM management terminal is configured for acquiring the configuration data packet and obtaining the identification number and the integrate circuit card identity according to the configuration data packet, generating a Profile and an activation code according to the identification number and the integrate circuit card identity, and returning the activation code to the eSIM operation terminal; and the eSIM device further comprises an LPA module, and the LPA module is configured for sending the activation code to the eSIM management terminal to acquire and activate the Profile.

In some embodiments, the eSIM operation terminal further comprises an authentication module, and the identification number comprises an eID and an IMEI; and the authentication module is configured for acquiring account opening information of a user, authenticating the eSIM device according to the account opening information and the identification number, and enabling the number selection module when the authentication is successful.

In some embodiments, the number selection module is further configured for acquiring a number selection strategy preset by a user, and selecting the integrate circuit card identity from the number pool according to the wireless information and the number selection strategy.

In some embodiments, detecting the wireless environment to obtain the wireless information by the request module comprises:

measuring wireless signals of all frequency points through a broadcast channel, and selecting frequency points with signal strengths greater than a preset strength for packaging to obtain the wireless information.

In some embodiments, the eSIM operation terminal further comprises a forwarding module; and the forwarding module is configured for obtaining a plurality of frequency points according to the wireless information, and when none of the plurality of frequency points belong to a frequency point range of the eSIM operation terminal, forwarding the identification number to eSIM operation terminals of other operators.

In a second aspect, an embodiment of the present disclosure further provides an eSIM device configuration system, which comprises an eSIM device, an eSIM operation terminal and an eSIM management terminal, wherein a plurality of preset Profiles are written into the eSIM device, and the eSIM device is configured to access the eSIM operation terminal through any one of the preset Profiles;

the eSIM device comprises a request module configured for detecting a wireless environment to obtain wireless information, and sending an identification number of the eSIM device, the wireless information and the plurality of preset Profiles to the eSIM operation terminal;

the eSIM operation terminal comprises a number selection module configured for receiving the identification number, the wireless information and the plurality of preset Profiles, selecting one of the preset Profiles according to the wireless information, binding the identification number and the selected preset Profile to obtain a configuration data packet, sending the configuration data packet to the eSIM management terminal to obtain an activation code, and sending an address of the eSIM management terminal and the activation code to the eSIM device;

the eSIM management terminal is configured for acquiring the configuration data packet and generating an activation code according to the configuration data packet, and returning the activation code to the eSIM operation terminal; and the eSIM device further comprises an LPA module, and the LPA module is configured for sending the activation code to the eSIM management terminal to enable the preset Profile selected by the number selection module.

In a third aspect, an embodiment of the present disclosure further provides an eSIM device configuration method, which is applied to the eSIM operation terminal of the eSIM device configuration system in the embodiment in the first aspect, wherein, the eSIM device configuration method comprises:

receiving the identification number and the wireless information from the eSIM device;

selecting the integrate circuit card identity from the number pool according to the wireless information;

binding the identification number and the integrate circuit card identity to obtain the configuration data packet;

sending the configuration data packet to the eSIM management terminal to obtain the activation code; and sending the address of the eSIM management terminal and the activation code to the eSIM device.

In a fourth aspect, an embodiment of the present disclosure further provides an eSIM device configuration method, which is applied to the eSIM device of the eSIM device configuration system in the embodiment in the first aspect, wherein, the eSIM device configuration method comprises:

detecting the wireless environment to obtain the wireless information;

sending the identification number of the eSIM device and the wireless information to the eSIM operation terminal to acquire the activation code and the address of the eSIM management terminal; and sending the activation code to the eSIM management terminal according to the address of the eSIM management terminal to acquire and activate the Profile.

In a fifth aspect, an embodiment of the present disclosure further provides an eSIM device configuration apparatus, which comprises:

at least one processor; and at least one memory for storing at least one program;

wherein the at least one program, when executed by the at least one processor, causes the at least one processor to implement the eSIM device configuration method in the embodiment in the fourth aspect.

In a sixth aspect, an embodiment of the present disclosure further provides a computer storage medium, which stores a program executable by a processor, wherein the program executable by the processor, when executed by the processor, implements the eSIM device configuration method in the embodiment in the third aspect or the fourth aspect.

The above technical solutions of the present disclosure have at least one of the following advantages or beneficial effects. The eSIM device detects the wireless environment to obtain the wireless information and reports the wireless information to the eSIM operation terminal. The eSIM operation terminal selects a proper integrate circuit card identity according to the wireless information. The eSIM management terminal generates a Profile according to the integrate circuit card identity and sends the Profile to the eSIM device for activation, and selects a proper Profile by selecting a proper integrate circuit card identity to be written into the eSIM device, thus optimizing a communication network of the eSIM device.

BRIEF DESCRIPTION OF THE DRAWINGS

FIG. 3 is a flow chart of an eSIM device configuration method applied to an eSIM operation terminal provided by an embodiment of the present disclosure:

FIG. 4 is a flow chart of an eSIM device configuration method applied to an eSIM device provided by an embodiment of the present disclosure:

FIG. 5 is a flow chart of an eSIM device configuration method applied to an eSIM operation terminal provided by another embodiment of the present disclosure; and FIG. 6 is a flow chart of an eSIM device configuration method applied to an eSIM device provided by another embodiment of the present disclosure.

DETAILED DESCRIPTION

The embodiments described in the present disclosure should not be regarded as limitations of the present disclosure, and all other embodiments obtained by those of ordinary skills in the art without going through any creative work should fall within the scope of protection of the present disclosure.

In the following description, "some embodiments" involved describe a subset of all possible embodiments, but it can be understood that "some embodiments" may be the same subset or different subsets of all possible embodiments, and may be combined with each other without conflict.

Unless otherwise defined, all technical and scientific terms used herein have the same meanings as those commonly understood by those of ordinary skills in the art. The terms used herein are only for the purpose of describing the embodiments of the present disclosure, and are not intended to limit the present disclosure.

Figure 1:
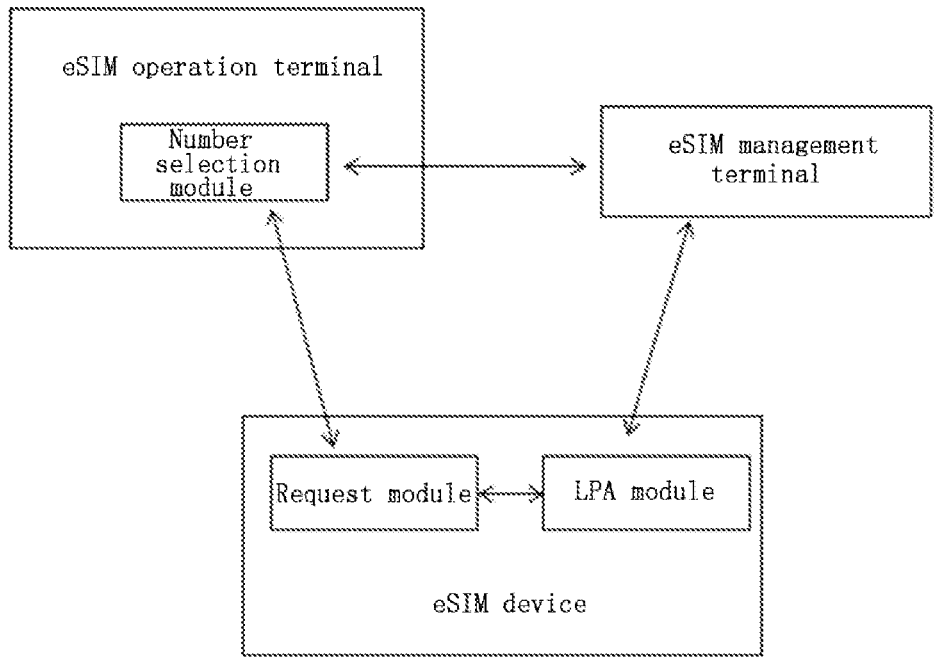
FIG. 1 is a schematic diagram of an eSIM device configuration system provided by an embodiment of the present disclosure.

An embodiment of the present disclosure provides an eSIM device configuration system, and with reference to FIG. 1, the eSIM device configuration system comprises an eSIM device, an eSIM operation terminal and an eSIM management terminal. A preset Profile is written into the eSIM device. The Profile is a collection of files, data and applications, and contains user identification information, service subscription information and other contents.

The eSIM device accesses the eSIM operation terminal through the preset Profile. The eSIM device comprises a request module configured for detecting a wireless environment to obtain wireless information, and sending an identification number of the eSIM device and the wireless information to the eSIM operation terminal.

The eSIM operation terminal comprises a number selection module configured for receiving the identification number and the wireless information, selecting an integrate circuit card identity from a number pool according to the wireless information, binding the identification number and the integrate circuit card identity to obtain a configuration data packet, sending the configuration data packet to the eSIM management terminal to obtain an activation code, and sending an address of the eSIM management terminal and the activation code to the eSIM device.

The eSIM management terminal is configured for acquiring the configuration data packet and obtaining the identification number and the integrate circuit card identity according to the configuration data packet, generating a Profile and an activation code according to the identification number and the integrate circuit card identity, and returning the activation code to the eSIM operation terminal.

The eSIM device further comprises an LPA module, and the LPA module is configured for sending the activation code to the eSIM management terminal to acquire and activate the Profile.

Specifically, after the eSIM device is started, a frequency coverage environment of a wireless network is automatically detected to obtain the wireless information, and the preset Profile activated in the eSIM device is used to access the eSIM operation terminal to establish a secure communication channel. The eSIM device uploads the identification number and the wireless information to the eSIM operation terminal. The eSIM operation terminal selects a proper integrate circuit card identity (ICCID) according to the wireless information, and binds the identification number and the ICCID to obtain the configuration data packet for characterizing a binding relationship between the identification number and the ICCID. The configuration data packet is sent to the eSIM management terminal to acquire the activation code, and the activation code and the address of the eSIM management terminal are forwarded to the eSIM device. After receiving the configuration data packet, the eSIM management terminal generates the Profile according to contents of the configuration data packet. The eSIM device sends the activation code to the eSIM management terminal according to the address of the eSIM management terminal. After receiving the activation code, the eSIM management terminal compares the activation code with the activation code generated by the eSIM management terminal, and if the two activation codes are consistent, the Profile is sent to the eSIM device, and the identification number of the eSIM device and the Profile are correspondingly registered in the eSIM management terminal to complete the activation.

It should be noted that the LPA (Local Profile Assistant) module is an international specification definition module, and is responsible for downloading and installing the Profile.

According to some specific embodiments of the present disclosure, detecting the wireless environment to obtain the wireless information by the request module comprises: measuring wireless signals of all frequency points through a broadcast channel, and selecting frequency points with signal strengths greater than a preset strength for packaging to obtain the wireless information.

Specifically, after the eSIM device is powered on the wireless signals of all frequency points may be measured through the broadcast channel, and the frequency points with the signal strengths greater than the preset strength are selected for packaging into the wireless information. A cellID of a cell in which the eSIM device is located is acquired, and the cellID is written into the wireless information, so that the wireless information comprises the cellID and a superior frequency point.

It should be noted that the eSIM device may also arrange the frequency points according to the signal strengths, and select the frequency points with the top three signal strengths for packaging into the wireless information.

Figure 2:
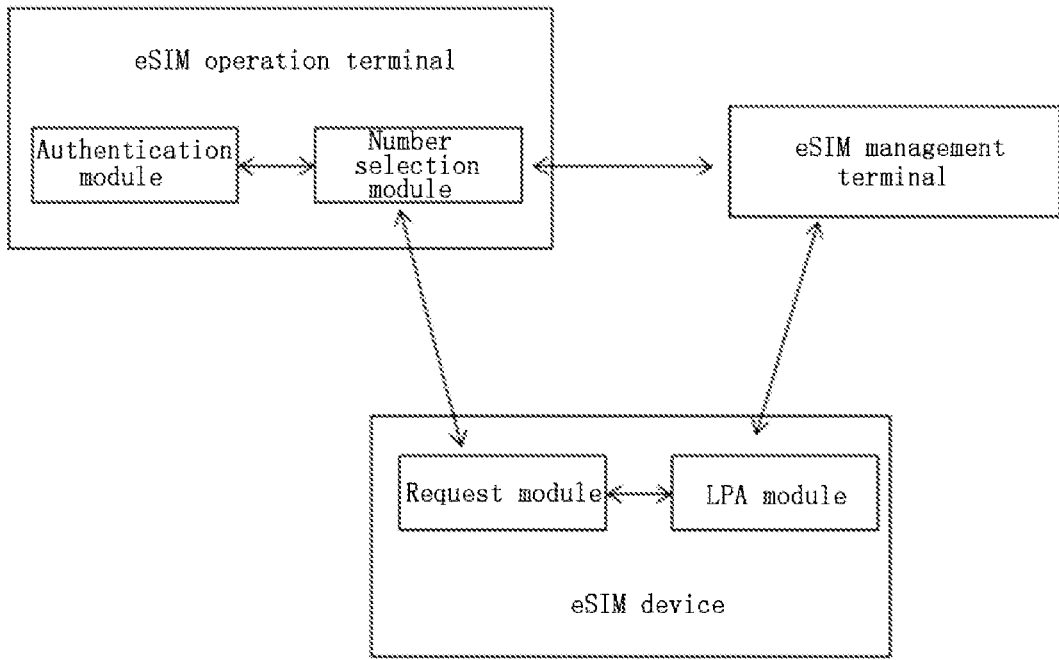
FIG. 2 is a schematic diagram of an eSIM device configuration system provided by another embodiment of the present disclosure.

According to some specific embodiments of the present disclosure, with reference to FIG. 2, the eSIM operation terminal further comprises an authentication module, and the identification number comprises an eID (electronic IDentity) and an IMEI (International Mobile Equipment Identity).

The authentication module is configured for acquiring account opening information of a user, authenticating the eSIM device according to the account opening information and the identification number, enabling the number selection module when the authentication is successful, and returning failure information to the eSIM device when the authentication fails.

Specifically: the user may log in to the eSIM operation terminal and preset the account opening information on the eSIM operation terminal, and the account opening information comprises the eID and the IMEI. When an eID device sends the identification number to an eID operation terminal, the eID operation terminal authenticates the eID device according to the account opening information preset by the user. If the identification information is the same as the account opening information and the identification number, it is indicated that the authentication is successful, and then the number selection module is enabled to allocate the ICCID. If the identification information is different from the account opening information and the identification number, it is indicated that the authentication fails, and then the number selection module is not enabled. Further, if the authentication fails, the failure information is returned to the eSIM device. The authentication module in this embodiment restricts a request from an unauthorized terminal, thus improving the security of an eID management terminal.

According to some specific embodiments of the present disclosure, the number selection module is further configured for acquiring a number selection strategy preset by the user, and selecting the integrate circuit card identity from the number pool according to the wireless information and the number selection strategy.

Specifically, the number selection module is also called a resource allocation module, and the number selection module acquires the number selection strategy preset by the user, and generates an automatic rule engine according to the number selection strategy and the wireless information. The automatic rule engine can select the proper ICCID from the number pool according to filtering conditions, and then the ICCID is bound to the eID. The filtering conditions comprise the number selection strategy of the user and the wireless information sent by the eID device. The number selection strategy comprises an expense, an operator, a device service type, and other contents, and the wireless information comprises a region in which the eSIM device is located and a superior frequency point in the region.

According to some specific embodiments of the present disclosure, the eSIM operation terminal further comprises a forwarding module.

The forwarding module is configured for obtaining a plurality of frequency points according to the wireless information, and when none of the plurality of frequency points belong to a frequency point range of the eSIM operation terminal, forwarding the identification number to eSIM operation terminals of other operators.

Specifically: when the superior frequency point reported by the eSIM device does not belong to the frequency point range of the accessed operator, the request from the eSIM device may be transferred to the eSIM operation terminals of other operators through the forwarding module of the eSIM operation terminal to obtain the activation code responded by the eSIM operation terminals of other operators and the address of the eSIM management terminal, and then the Profiles of other operators are written into the eSIM device.

An embodiment of the present disclosure further provides another eSIM device configuration system, which comprises an eSIM device, an eSIM operation terminal and an eSIM management terminal, wherein a plurality of preset Profiles are written into the eSIM device writes, and the eSIM device accesses the eSIM operation terminal through any one of the preset Profiles.

The eSIM device comprises a request module configured for detecting a wireless environment to obtain wireless information, and sending an identification number of the eSIM device, the wireless information and the plurality of preset Profiles to the eSIM operation terminal.

The eSIM operation terminal comprises a number selection module configured for receiving the identification number, the wireless information and the plurality of preset Profiles, selecting one of the preset Profiles according to the wireless information, binding the identification number and the selected preset Profile to obtain a configuration data packet, sending the configuration data packet to the eSIM management terminal to obtain an activation code, and sending an address of the eSIM management terminal and the activation code to the eSIM device.

The eSIM management terminal is configured for acquiring the configuration data packet and generating an activation code according to the configuration data packet, and returning the activation code to the eSIM operation terminal.

The eSIM device further comprises an LPA module, and the LPA module is configured for sending the activation code to the eSIM management terminal to enable the preset Profile selected by the number selection module.

Specifically, under the condition that the plurality of preset Profiles have been written into the eSIM device, the activated preset Profile is selected to access the network and access the eSIM operation terminal. The eSIM device sends the wireless information, the identification number and the plurality of preset Profiles to the eSIM operation terminal. The eSIM operation terminal selects a proper preset Profile as a Profile to be activated according to the wireless information, binds the identification number and the selected preset Profile to obtain the configuration data packet, sends 30) the configuration data packet to the eSIM management terminal to obtain the activation code, and sends the address of the eSIM management terminal and the activation code to the eSIM device. The LPA module of the eSIM device sends the activation code to the eSIM management terminal according to the address of the eSIM management terminal, and the LPA module and the eSIM management terminal verify each other through the activation code, thus enabling the preset Profile selected by the eSIM operation terminal in the eSIM device to realize remote switching of multiple Profiles.

According to some specific embodiments of the present disclosure, the number selection module is further configured for acquiring a number selection strategy preset by a user, and selecting the proper preset Profile from the plurality of preset Profiles according to the wireless information and the number selection strategy.

Specifically, the number selection module acquires the number selection strategy preset by the user, and generates an automatic rule engine according to the number selection strategy and the wireless information. The automatic rule engine can select the proper preset Profile as the Profile to be activated from the plurality of preset Profiles according to filtering conditions, and then bind the selected preset Profile and the identification code. The filtering conditions comprise the number selection strategy of the user and the wireless information sent by the eID device. The number selection strategy comprises an expense, an operator, a device service type, and other contents, and the wireless information comprises a region in which the eSIM device is located and a superior frequency point in the region.

An embodiment of the present disclosure further provides an eSIM device configuration method, which is applied to the eSIM operation terminal of the eSIM device configuration system in the embodiment above. With reference to FIG. 3, the eSIM device configuration method comprises, but is not limited to, step S310, step S320, step S330, step S340 and step S350.

In step S310, the identification number and the wireless information from the eSIM device are received.

In step S320, the integrate circuit card identity is selected from the number pool according to the wireless information.

In step S330, the identification number and the integrate circuit card identity are bound to obtain the configuration data packet.

In step S340, the configuration data packet is sent to the eSIM management terminal to obtain the activation code.

In step S350, the address of the eSIM management terminal and the activation code are sent to the eSIM device.

According to some specific embodiments of the present disclosure, the identification number comprises an eID and an IMEI. The eSIM device configuration method applied to the eSIM operation terminal further comprises the following steps of:

acquiring account opening information of a user;

authenticating the eSIM device according to the account opening information and the identification number; and executing the step S320 to the step S350 when the authentication is successful, and not executing the step S320 to the step S350 when the authentication fails.

According to some specific embodiments of the present disclosure, the eSIM device configuration method applied to the eSIM operation terminal further comprises the following steps of:

acquiring a number selection strategy preset by the user; and selecting the integrate circuit card identity from the number pool according to the wireless information and the number selection strategy.

According to some specific embodiments of the present disclosure, the eSIM device configuration method applied to the eSIM operation terminal further comprises the following steps of:

obtaining a plurality of frequency points according to the wireless information; and when none of the plurality of frequency points belong to a frequency point range of the eSIM operation terminal, forwarding the identification number to eSIM operation terminals of other operators.

An embodiment of the present disclosure further provides an eSIM device configuration method, which is applied to the eSIM device of the eSIM device configuration system in the embodiment above. With reference to FIG. 4, the eSIM device configuration method applied to the eSIM device comprises, but is not limited to, step S410, step S420 and step S430.

In step S410, the wireless environment is detected to obtain the wireless information.

In step S420, the identification number of the eSIM device and the wireless information are sent to the eSIM operation terminal to acquire the activation code and the address of the eSIM management terminal.

In step S430, the activation code is sent to the eSIM management terminal according to the address of the eSIM management terminal to acquire and activate the Profile.

According to some specific embodiments of the present disclosure, the step S410 comprises the following steps of:
measuring wireless signals of all frequency points through a broadcast channel; and
selecting frequency points with signal strengths greater than a preset strength for packaging to obtain the wireless information.

An embodiment of the present disclosure further provides an eSIM device configuration method, which is applied to the eSIM operation terminal of the eSIM device configuration system in the embodiment above. With reference to FIG. 5, the eSIM device configuration method comprises, but is not limited to, step S510, step S520, step S530, step S540 and step S550.

In step S510, the identification number, the wireless information and the plurality of preset Profiles are received.

In step S520, one of the preset Profiles is selected according to the wireless information.

In step S530, the identification number and the selected preset Profile are bound to obtain the configuration data packet.

In step S540, the configuration data packet is sent to the eSIM management terminal to obtain the activation code.

In step S550, the address of the eSIM management terminal and the activation code are sent to the eSIM device.

According to some specific embodiments of the present disclosure, the eSIM device configuration method applied to the eSIM operation terminal further comprises the following steps of:
acquiring a number selection strategy preset by the user; and
selecting one preset Profile from the plurality of preset Profiles according to the wireless information and the number selection strategy.

An embodiment of the present disclosure further provides an eSIM device configuration method, which is applied to the eSIM device of the eSIM device configuration system in the embodiment above, and a plurality of preset Profiles are written into the eSIM device. With reference to FIG. 6, the eSIM device configuration method comprises, but is not limited to, step S610, step S620 and step S630.

In step S610, the wireless environment is detected to obtain the wireless information.

In step S620, the identification number of the eSIM device, the wireless information and the plurality of preset Profiles are sent to the eSIM operation terminal to acquire the activation code and the address of the eSIM management terminal.

In step S630, the activation code is sent to the eSIM management terminal according to the address of the eSIM management terminal to activate one of the preset Profiles.

An embodiment of the present disclosure further provides an eSIM device configuration apparatus, which comprises:
at least one processor; and
at least one memory for storing at least one program;
wherein the at least one program, when executed by the at least one processor, causes the at least one processor to implement the eSIM device configuration method in the embodiment above.

An embodiment of the present disclosure further provides a computer-readable storage medium, wherein the computer-readable storage medium stores a computer-executable instruction, and the computer-executable instruction is executed by one or more control processors, for example, to execute the steps described in the above embodiment.

Those of ordinary skills in the art can understand that all or some of steps in the method, and the systems disclosed above can be implemented as software, firmware, hardware and appropriate combinations thereof. Some or all of the physical components can be implemented as software executed by a processor, such as a central processing unit, a digital signal processor or a microprocessor, or implemented as hardware, or implemented as an integrated circuit, such as an application-specific integrated circuit. Such software can be distributed on a computer-readable 20) medium, and the computer-readable medium may include a computer storage medium (or a non-transitory medium) and a communication medium (or a transitory medium). It is well known to those of ordinary skills in the art that the term 'computer storage medium' comprises a volatile and nonvolatile, removable and non-removable medium implemented in any method or technology for storing information (such as a computer readable instruction, a data structure, a program module, or other data). The computer storage medium includes but not limited to RAM, ROM, EEPROM, flash storage or other storage technologies, CD-ROM, digital versatile disk (DVD) or other optical disk storage, magnetic box, magnetic tape, magnetic disk storage or other magnetic storage devices, or any other medium that can be used to store desired information and accessed by a computer. Furthermore, it is well known to those of ordinary skills in the art that the communication medium typically includes a computer readable instruction, a data structure, a program module or other data in a modulated data signal such as a carrier wave or other transmission mechanism, and may include any information delivery medium.

The preferred embodiments of the present disclosure have been described in detail above, but the present disclosure is not limited to the embodiments above. Those of ordinary skills in the art may further make various equivalent modifications or substitutions without departing from the gist of the present disclosure, and these equivalent modifications or substitutions are all included in the scope defined by the claims of the present disclosure.

What is claimed is:

1. An eSIM device configuration system, comprising an eSIM device, an eSIM operation terminal and an eSIM management terminal, wherein a preset Profile is written into the eSIM device, and the eSIM device is configured to access the eSIM operation terminal through the preset Profile;

the eSIM device comprises a request module configured for detecting a wireless environment to obtain wireless information, and sending an identification number of the eSIM device and the wireless information to the eSIM operation terminal;

the eSIM operation terminal comprises a number selection module configured for receiving the identification number and the wireless information, selecting an integrate circuit card identity from a number pool according to the wireless information, binding the identification number and the integrate circuit card identity to obtain a configuration data packet, sending the configuration data packet to the eSIM management terminal to obtain an activation code, and sending an address of the eSIM management terminal and the activation code to the eSIM device;

the eSIM management terminal is configured for acquiring the configuration data packet and obtaining the identification number and the integrate circuit card identity according to the configuration data packet, generating a Profile and an activation code according to the identification number and the integrate circuit card identity, and returning the activation code to the eSIM operation terminal; and the eSIM device further comprises an LPA (Local Profile Assistant) module, and the LPA module is configured for sending the activation code to the eSIM management terminal to acquire and activate the Profile, wherein the eSIM operation terminal further comprises an authentication module, and the identification number comprises an eID (electronic IDentity) and an IMEI (International Mobile Equipment Identity); and the authentication module is configured for acquiring account opening information of a user, authenticating the eSIM device according to the account opening information and the identification number, and enabling the number selection module when the authentication is successful.

2. The eSIM device configuration system according to claim 1, wherein the number selection module is further configured for acquiring a number selection strategy preset by a user, and selecting the integrate circuit card identity from the number pool according to the wireless information and the number selection strategy.

3. The eSIM device configuration system according to claim 1, wherein detecting the wireless environment to obtain the wireless information by the request module comprises:

measuring wireless signals of all frequency points through a broadcast channel, and selecting frequency points with signal strengths greater than a preset strength for packaging to obtain the wireless information.

4. The eSIM device configuration system according to claim 3, wherein the eSIM operation terminal further comprises a forwarding module; and the forwarding module is configured for obtaining a plurality of frequency points according to the wireless information, and when none of the plurality of frequency points belong to a frequency point range of the eSIM operation terminal, forwarding the identification number to eSIM operation terminals of other operators.

5. An eSIM device configuration method, applied to the eSIM operation terminal of the eSIM device configuration system according to claim 1, wherein, the eSIM device configuration method comprises: receiving the identification number and the wireless information from the eSIM device; selecting the integrate circuit card identity from the number pool according to the wireless information; binding the identification number and the integrate circuit card identity to obtain the configuration data packet; sending the configuration data packet to the eSIM management terminal to obtain the activation code; and sending the address of the eSIM management terminal and the activation code to the eSIM device.

6. An eSIM device configuration method, applied to the eSIM device of the eSIM device configuration system according to claim 1, wherein, the eSIM device configuration method comprises:

detecting the wireless environment to obtain the wireless information;

sending the identification number of the eSIM device and the wireless information to the eSIM operation terminal to acquire the activation code and the address of the eSIM management terminal; and sending the activation code to the eSIM management terminal according to the address of the eSIM management terminal to acquire and activate the Profile.

7. An eSIM device configuration apparatus, applied to the eSIM operation terminal of the eSIM device configuration system according to claim 1, comprising: at least one processor; and at least one memory for storing at least one program.

8. A non-transitory computer-readable storage medium, applied to the eSIM operation terminal of the eSIM device configuration system according to claim 1, storing a program executable by a processor.

9. An eSIM device configuration apparatus, applied to the eSIM device of the eSIM device configuration system according to claim 1, comprising: at least one processor; and at least one memory for storing at least one program.

10. A non-transitory computer-readable storage medium, applied to the eSIM device of the eSIM device configuration system according to claim 1, storing a program executable by a processor.

11. An eSIM device configuration system, comprising an eSIM device, an eSIM operation terminal and an eSIM management terminal, wherein a plurality of preset Profiles are written into the eSIM device, and the eSIM device is configured to access the eSIM operation terminal through any one of the preset Profiles;

the eSIM device comprises a request module configured for detecting a wireless environment to obtain wireless information, and sending an identification number of the eSIM device, the wireless information and the plurality of preset Profiles to the eSIM operation terminal;

the eSIM operation terminal comprises a number selection module configured for receiving the identification number, the wireless information and the plurality of preset Profiles, selecting one of the preset Profiles according to the wireless information, binding the identification number and the selected preset Profile to obtain a configuration data packet, sending the configuration data packet to the eSIM management terminal to obtain an activation code, and sending an address of the eSIM management terminal and the activation code to the eSIM device;

the eSIM management terminal is configured for acquiring the configuration data packet and generating an activation code according to the configuration data packet, and returning the activation code to the eSIM operation terminal; and the eSIM device further comprises an LPA module, and the LPA module is configured for sending the activation code to the eSIM management terminal to enable the preset Profile selected by the number selection module, wherein the eSIM operation terminal further comprises an authentication module, and the identification number comprises an eID (electronic IDentity) and an IMEI (International Mobile Equipment Identity); and the authentication module is configured for acquiring account opening information of a user, authenticating the eSIM device according to the account opening information and the identification number, and enabling the number selection module when the authentication is successful.

* * * * *